US009998623B2

(12) United States Patent
Yoshimoto (10) Patent No.: US 9,998,623 B2
(45) Date of Patent: Jun. 12, 2018

(54) IMAGE FORMING APPARATUS, IMAGE FORMING METHOD, AND RECORDING MEDIUM THEREFOR THAT ENABLE REDUCED SETTING LOADS OF A PLURALITY OF IMAGE FORMING APPARATUSES

(71) Applicant: Kyocera Document Solutions Inc., Osaka (JP)

(72) Inventor: Yusuke Yoshimoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days. days.

(21) Appl. No.: 15/387,479

(22) Filed: Dec. 21, 2016

(65) Prior Publication Data

US 2017/0180584 A1    Jun. 22, 2017

(30) Foreign Application Priority Data

Dec. 21, 2015  (JP) ................................. 2015-249087

(51) Int. Cl.
H04N 1/00 (2006.01)
(52) U.S. Cl.
CPC ..... *H04N 1/00962* (2013.01); *H04N 1/00209* (2013.01); *H04N 1/00344* (2013.01); *H04N 1/00347* (2013.01); *H04N 2201/0094* (2013.01)
(58) Field of Classification Search
CPC ...................... H04N 1/00962; H04N 1/00209
See application file for complete search history.

(56) References Cited

U.S. PATENT DOCUMENTS

| 6,141,695 A * | 10/2000 | Sekiguchi | H04L 51/066 709/206 |
|---|---|---|---|
| 2006/0085440 A1* | 4/2006 | Jandhyala | G06F 17/30067 |
| 2009/0238213 A1* | 9/2009 | Kasatani | H04N 1/00344 370/503 |
| 2015/0189116 A1* | 7/2015 | Ito | H04N 1/00973 358/1.13 |

FOREIGN PATENT DOCUMENTS

| JP | 2011-086996 A | 4/2011 |
|---|---|---|
| JP | 2013-143658 A | 7/2013 |

* cited by examiner

*Primary Examiner* — Ibrahim Siddo
(74) *Attorney, Agent, or Firm* — James Judge (57) ABSTRACT

An image forming apparatus includes a setting unit, a storage unit, an operation display unit, and a setting-change-information transmitting unit. The storage unit stores a shared-setting list as a shared-setting target. The operation display unit accepts a shared-setting input and a setting-change input. The shared-setting input is for setting a shared-setting item included in the shared-setting list among the plurality of setting items. The setting-change input is for changing settings of the plurality of setting items. The setting-change-information transmitting unit, in response to the setting-change input for the shared-setting item, transmits to the management device setting change information indicating content of the setting change. The setting unit, in response to reception of the setting change information, sets the setting item using the received setting change information if there has been a setting change to the setting item included in the shared-setting list.

8 Claims, 9 Drawing Sheets

Shared-Information-Transmission-Setting Screen
(Image Forming Apparatuses 100a and 100b)

| Shared-Setting Function | Cancel |
|---|---|

Shared-Setting Function

Shared-Setting-Information-Transmission Destination settei@mail.co.jp

Apparatus Affiliation Information

AAA. BBB. CCC

Shared-Information-Transmission-Setting Screen
(Image Forming Apparatus 100c)

| Shared-Setting Function | Cancel |
|---|---|

Shared-Setting Function

Shared-Setting-Information-Transmission Destination settei@mail.co.jp

Apparatus Affiliation Information

AAA. BBB

Copy Setting Screen (Image Forming Apparatus 100a)

FIG. 6B

Copy Setting Screen (Image Forming Apparatus 100b)

Copy Setting Screen (Image Forming Apparatus 100a)

FIG. 9B

Copy Setting Screen (Image Forming Apparatus 100b)

IMAGE FORMING APPARATUS, IMAGE FORMING METHOD, AND RECORDING MEDIUM THEREFOR THAT ENABLE REDUCED SETTING LOADS OF A PLURALITY OF IMAGE FORMING APPARATUSES

INCORPORATION BY REFERENCE

This application is based upon, and claims the benefit of priority from, corresponding Japanese Patent Application No. 2015-249087 filed in the Japan Patent Office on Dec. 21, 2015, the entire contents of which are incorporated herein by reference.

BACKGROUND

Unless otherwise indicated herein, the description in this section is not prior art to the claims in this application and is not admitted to be prior art by inclusion in this section.

A typical image forming apparatus (for example, a printer, a multifunction printer, or a multi-functional peripheral) has been multi-functionalized. However, in conjunction with this, a work load for settings to operate respective functions has been increasing. Especially, settings of an introduction of a new image forming apparatus and an installation of an application are complicated. This causes the increased load for an administrator as the number of the apparatuses increases. For such problem, there is proposed a technique that is centralized to store and manage histories of set values of a plurality of image processing apparatuses to use the stored set value in another apparatus. On the other hand, in a method for obtaining setting information from another image forming apparatus, there is proposed a technique that enables the flexible change of an image processing apparatus as an acquisition destination of the setting information.

SUMMARY

An image forming apparatus according to one aspect of the disclosure is adapted as one of a plurality of image forming apparatuses in an image forming system including the plurality of image forming apparatuses and a management device. The management device mediates communications among the plurality of image forming apparatuses. The image forming apparatus includes a setting unit, a storage unit, an operation display unit, and a setting-change-information transmitting unit. The setting unit sets a plurality of setting items. The plurality of setting items determine operational content of the image forming apparatus. The storage unit stores a shared-setting list as a shared-setting target among the plurality of setting items. The operation display unit accepts a shared-setting input and a setting-change input. The shared-setting input is for setting a shared-setting item included in the shared-setting list among the plurality of setting items. The setting-change input is for changing settings of the plurality of setting items. The setting-change-information transmitting unit, in response to the setting-change input for the shared-setting item, transmits to the management device setting change information indicating content of the setting change. The setting unit, in response to reception of the setting change information, sets the setting item using the received setting change information if there has been a setting change to the setting item included in the shared-setting list.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as "embodiment") with reference to the drawings.

Figure 1:
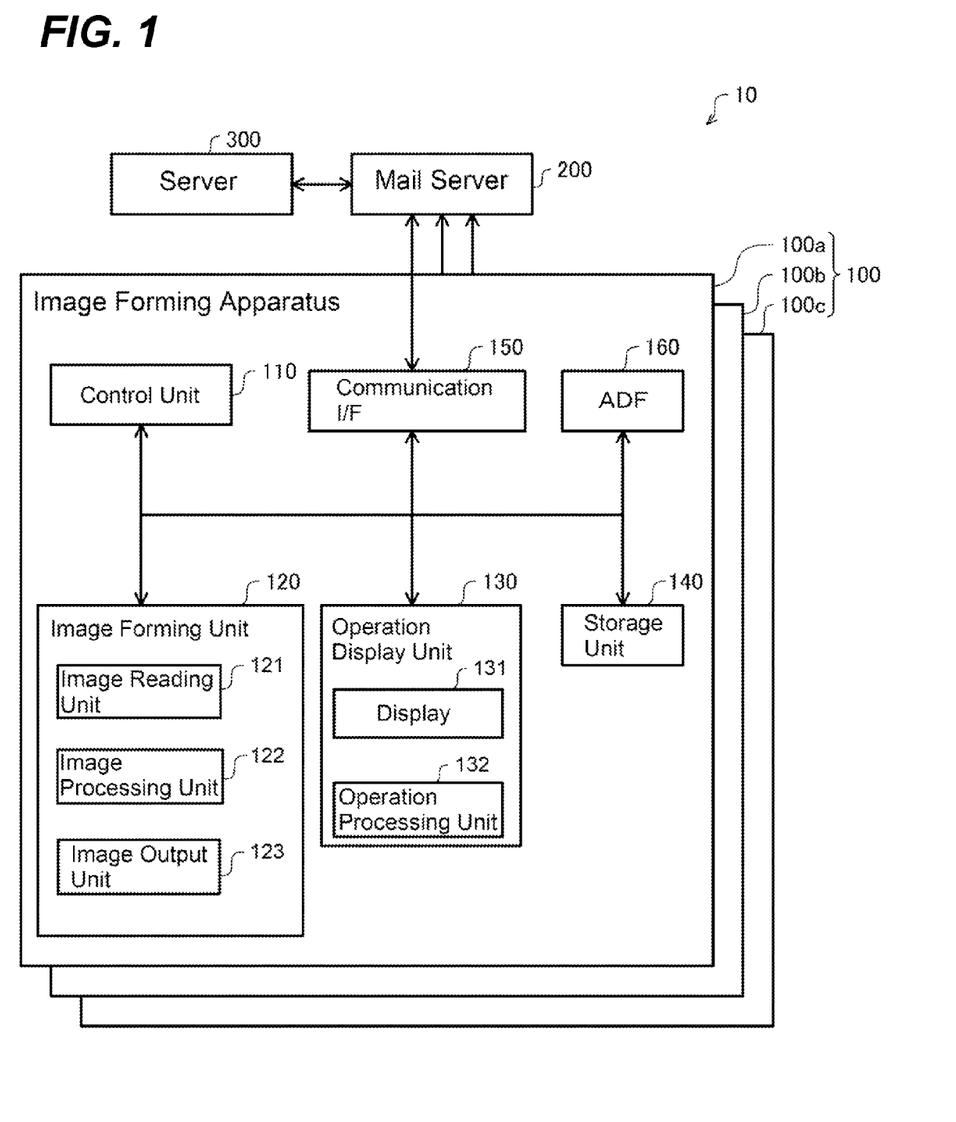
FIG. 1 illustrates a functional configuration of an image forming system according to one embodiment of the disclosure.

FIG. 1 illustrates a functional configuration of an image forming system 10 according to one embodiment of the disclosure. The image forming system 10 includes an image forming apparatus group 100, a mail server 200, and a server 300. The image forming apparatus group 100 is constituted of three image forming apparatuses 100a, 100b, and 100c. In the embodiment, the three image forming apparatuses 100a, 100b, and 100c have an identical configuration. The image forming apparatus 100a includes a control unit 110, an image forming unit 120, an operation display unit 130, a storage unit 140, a communication interface unit 150, and an automatic document feeder (ADF) 160.

The mail server 200 is connected to the three image forming apparatuses 100a, 100b, and 100c as terminals and the server 300 via a network. The mail server 200 is connected to the three image forming apparatuses 100a, 100b, and 100c using the communication interface unit 150. The mail server 200 accumulates mails received from the server 300 and the three image forming apparatuses 100a, 100b, and 100c, and transmits mails to respond to inquiries from the server 300 and the three image forming apparatuses 100a, 100b, and 100c. An interval of the inquiries can be set to any period as a certain period, such as every 30 minutes or every one hour. Thus, the server 300 functions as a management device that mediates communications among the three image forming apparatuses 100a, 100b, and 100c.

The image forming unit 120 includes an image reading unit 121, an image processing unit 122, and an image output unit 123. The image reading unit 121 reads an image from an original document to create image data. The image processing unit 122 processes the image data in accordance with a print setting including a plurality of setting items. The image output unit 123 executes printing based on the processed image data on a print medium. Thus, the plurality of the setting items determine operation content of the image forming apparatus 100a including the image forming unit 120.

The operation display unit 130 includes a display 131 and an operation processing unit 132. The display 131 functions as a touch panel to display various menus as an entry screen. The operation processing unit 132 accepts an operation input by a user from the display 131, which functions as the touch panel, and various kinds of buttons and switches (not illustrated).

The control unit 110 includes: a main storage unit such as a RAM and a ROM; and a control unit such as a microprocessing unit (MPU) and a central processing unit (CPU). The control unit 110 has a controller function related to interfaces, such as various I/Os, a universal serial bus (USB), a bus, and other hardware, and entirely controls each of the three image forming apparatuses 100a, 100b, and 100c.

The storage unit 140 is a storage device constituted of a hard disk drive, a flash memory, or a similar medium, which are non-transitory recording media, and stores control programs and data for processes executed by the control unit 110. The storage unit 140 stores various kinds of set contents such as the print setting and apparatus affiliation information.

Figure 2:
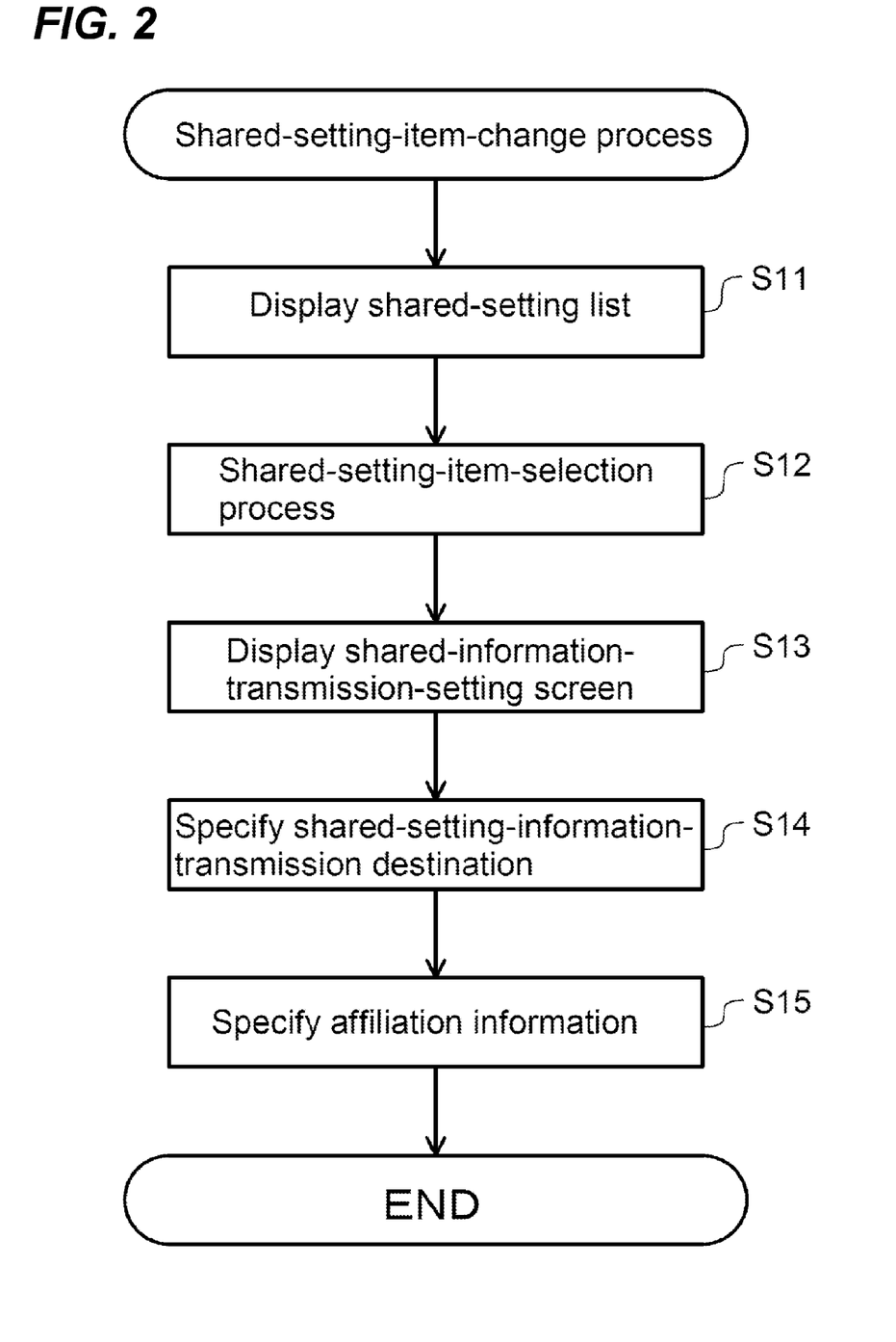
FIG. 2 illustrates a procedure for a shared-setting-item-change process according to the one embodiment.
Figure 3:
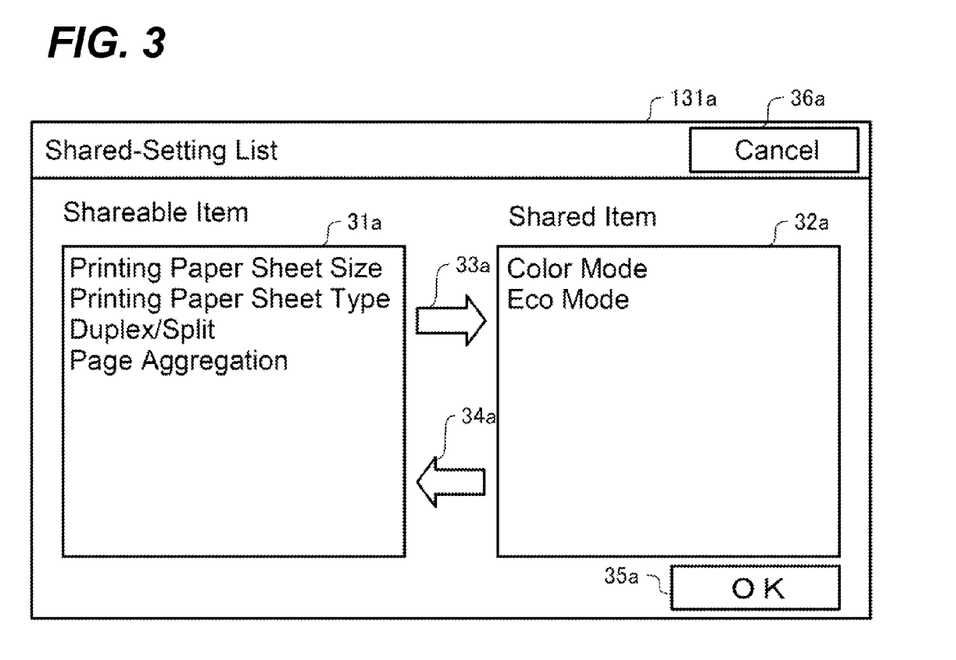
FIG. 3 illustrates a shared-setting list according to the one embodiment.

FIG. 2 illustrates a procedure for a shared-setting-item-change process according to the one embodiment. FIG. 3 illustrates a shared-setting list 131a according to the one embodiment. At Step S11, each of users of the image forming apparatus group 100 operates the operation processing unit 132 to cause the display 131 to display the shared-setting list 131a. The shared-setting list 131a is a screen for changing the setting item, which is a shared target among of the respective three image forming apparatuses 100a, 100b, and 100c.

In this example, shareable setting items are the following six setting items: a "printing paper sheet size," a "printing paper sheet type," a "duplex/split," a "page aggregation," a "color mode," and an "eco mode." A list window 31a displays the following four unselected shareable setting items: the "printing paper sheet size," the "printing paper sheet type," the "duplex/split," and the "page aggregation." A list window 32a displays the following two setting items selected as shared-setting items, the "color mode," and the "eco mode." A cancel icon 36a is an icon for closing the shared-setting list 131a.

At Step S12, the user selects the shared-setting item from the shared-setting list 131a. This selection adds the shared-setting item, which is caused by touching an arrow icon 33a in a state where the user has touched to invert any of the "printing paper sheet size," the "printing paper sheet type," the "duplex/split," and "the page aggregation" (for example, the "printing paper sheet size") in the list window 31a, that is, by a shared-setting input.

This causes the set-shareable-setting item (in this example, the "printing paper sheet size") to be additionally displayed on the list window 32a. An arrow icon 34a ensures removing the setting item from the shared-setting item and changing the removed setting item into the shareable setting item with the similar operation. When the user touches an OK icon 35a, the selection of the shared-setting item is completed.

Figure 4A:
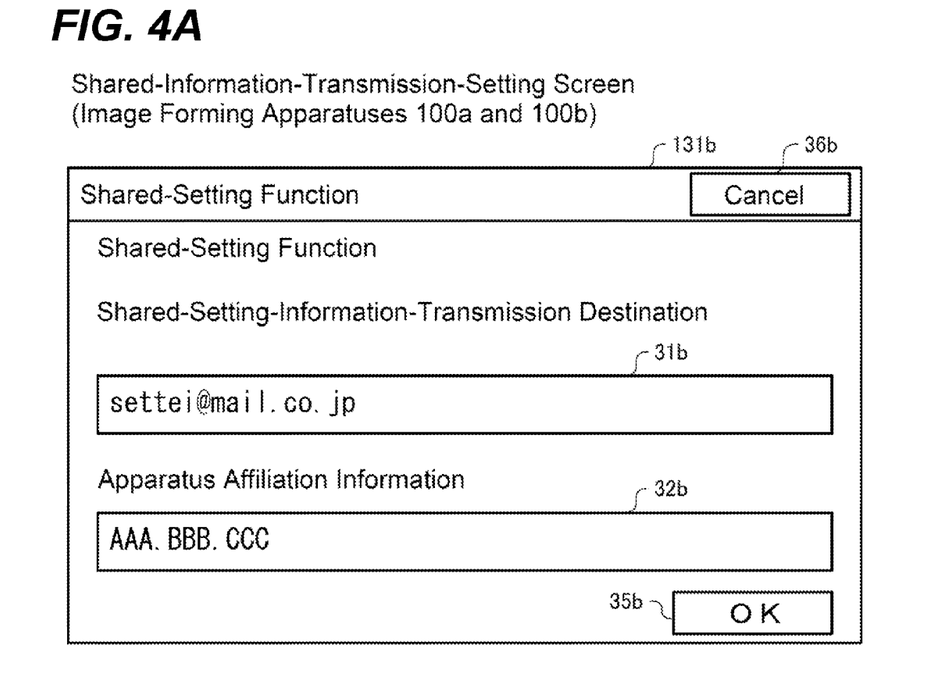
FIGS. 4A and 4B illustrate a shared-information-transmission-setting screen according to the one embodiment.
Figure 4B:
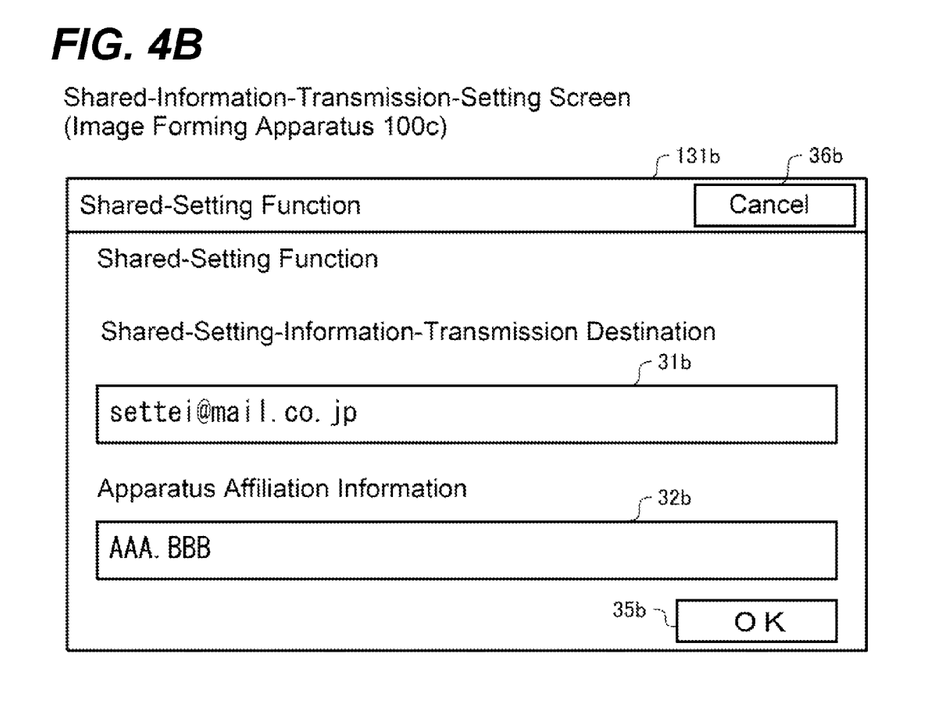

FIGS. 4A to 4B illustrate a shared-information-transmission-setting screen 131b according to the one embodiment. At Step S13, the user operates the operation processing unit 132 of the image forming apparatus 100a to cause the display 131 to display the shared-information-transmission-setting screen 131b. The shared-information-transmission-setting screen 131b is a screen for setting a shared-setting-transmission destination and the apparatus affiliation information of the image forming apparatus 100a.

At Step S14, the user specifies a shared-setting-information-transmission destination. In this example, the user specifies an e-mail address (settei@mail.co.jp) as the shared-setting-transmission destination (destination address) in a field 31b. The specification of the e-mail address is performed by, for example, a method where one address is selected from a plurality of e-mail addresses, which appear when the user puts a cursor in the field 31b, or inputting the one address with a screen keyboard. In this example, assume that the server 300 is specified as the shared-setting-transmission destination. A cancel icon 36b is an icon for closing the shared-information-transmission-setting screen 131b.

At Step S15, the respective users specify the affiliation information of the image forming apparatuses 100a and 100b (see FIG. 4A). This specification is performed when the respective users of the image forming apparatuses 100a and 100b input "AAA.BBB.CCC" as the apparatus affiliation information. In the embodiment, the apparatus affiliation information includes "AAA," which is a character string to specify any of divisions, "BBB," which is a character string to specify any of departments, and "CCC," which is a character string to specify any of sections. Here, the department is in a lower hierarchy of the division, and the section is in a lower hierarchy of the division.

Thus, the image forming apparatuses 100a and 100b are specified to belong to "AAA division BBB department CCC section," which is an identical affiliation group. This causes the image forming apparatuses 100a and 100b to have a shared setting of the shared-setting item within "AAA division BBB department CCC section."

The user of the image forming apparatus 100c inputs "AAA.BBB" as its apparatus affiliation information (see FIG. 4B). Thus, the image forming apparatus 100c has been specified to belong to "AAA division BBB department." This causes the image forming apparatus 100c to have a shared setting of the shared-setting item within "AAA division BBB department" in conjunction with the other image forming apparatuses 100a and 100b.

Thus, the respective users perform such operation on the entire image forming apparatuses group 100. This causes the image forming apparatus group 100 to have the shared setting within the set range.

Figure 5:
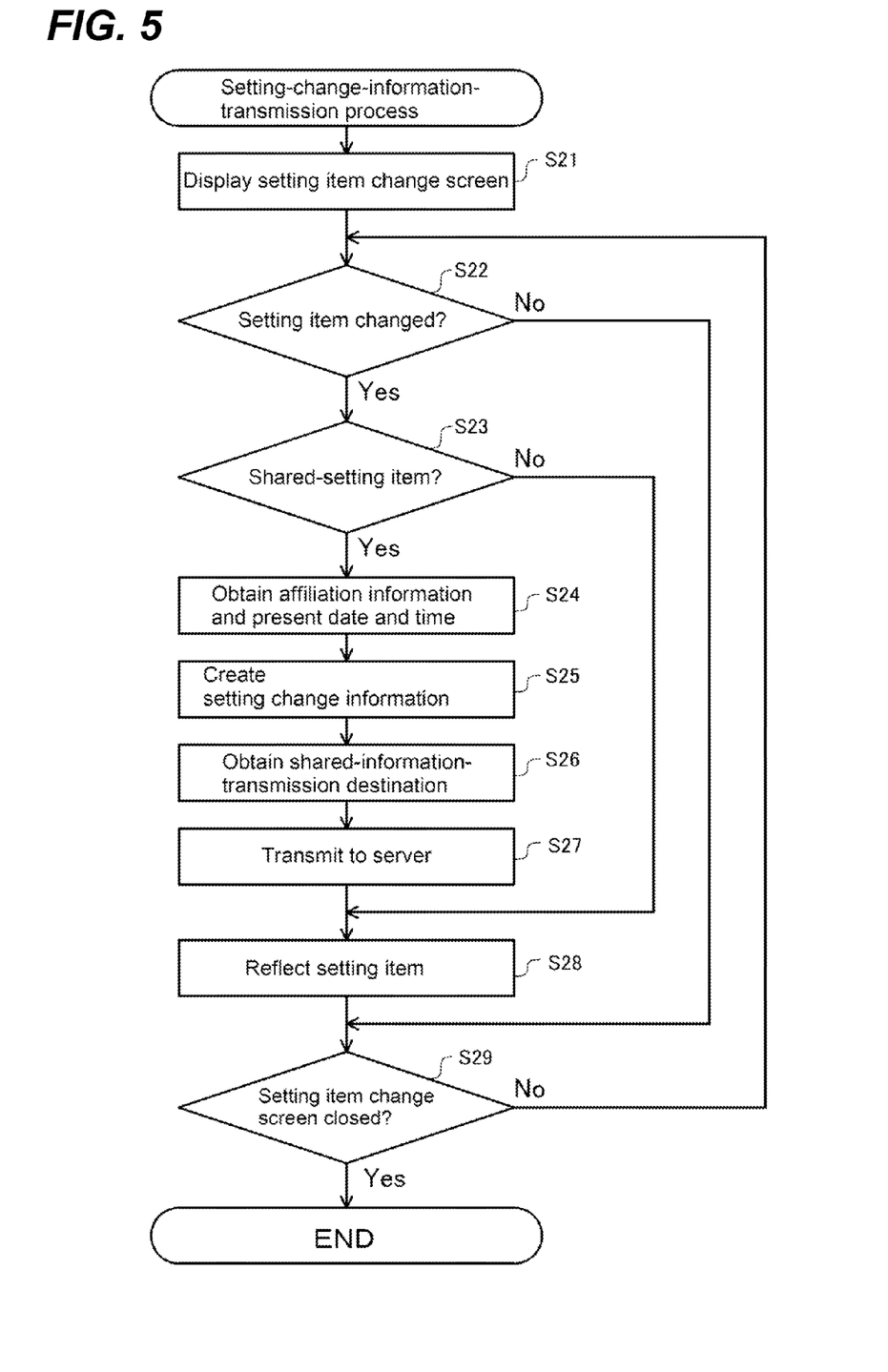
FIG. 5 illustrates a procedure for a setting-change-information-transmission process according to the one embodiment.
Figure 6A:
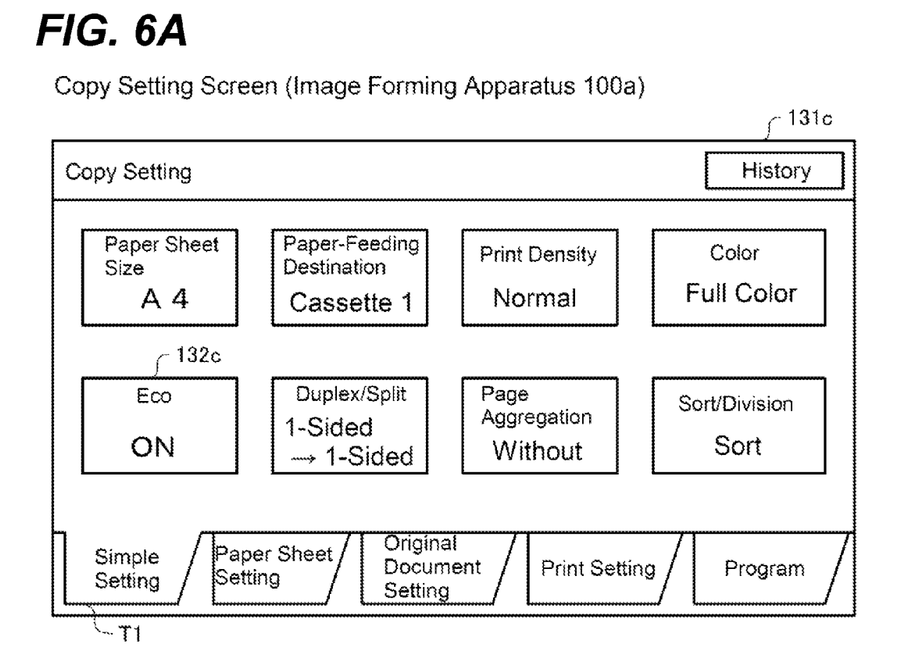
FIGS. 6A and 6B illustrate a copy setting screen according to the one embodiment.
Figure 6B:
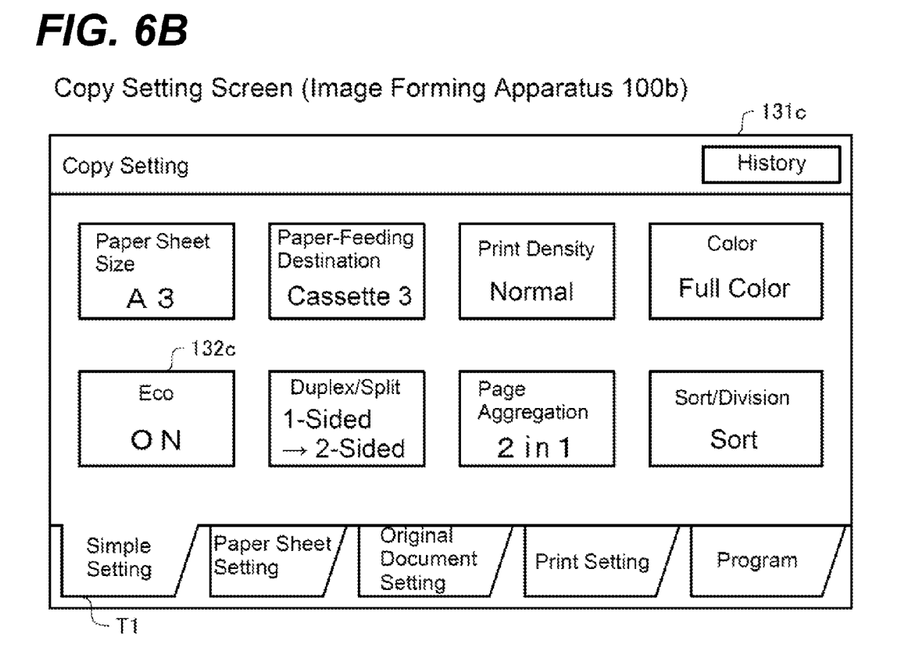

FIG. 5 illustrates a procedure for a setting-change-information-transmission process according to the one embodiment. FIGS. 6A to 6B illustrate a copy setting screen 131c according to the one embodiment. The following describes a setting change related to a copy setting as one example.

At Step S21, the user operates the operation processing unit 132 of the image forming apparatus 100a to cause the display 131 to display the copy setting screen 131c (setting item change screen). The copy setting screen 131c is a screen for changing the setting of the image forming apparatus 100a. In the embodiment, the copy setting screen 131c includes: a simple setting tab T1, a paper-sheet-setting tab, an original-document-setting tab; a print-setting tab, and a program tab. In FIGS. 6A to 6B, the simple setting tab T1 is selected.

The simple setting tab T1 includes eight icons 132c for settings: a "paper sheet size (printing paper sheet size)," a "paper-feeding destination," a "print density," a "color," an "eco," a "duplex/split," a "page aggregation," and a "sort/division." In this example, assume that the setting-change input by the user changes the "paper sheet size" and "eco" setting into "A4" and "ON," respectively.

At Step S22, since the setting is changed, the control unit 110 advances the process to Step S23. At Step S23, the control unit 110 changes a process content in accordance with a determination whether or not the changed setting item is the shared-setting item. Specifically, the control unit 110 advances the process of the "paper sheet size" setting to Step S28 and advances the process of the "eco" setting to Step S24. At Step S28, the control unit 110 changes the "paper sheet size" setting of the image forming apparatus 100a into "A4."

At Step S24, the control unit 110 obtains the affiliation information of the image forming apparatus 100a and a present date and time. In this example, the control unit 110 obtains "AAA.BBB.CCC" as the affiliation information of the image forming apparatus 100a. The present date and time is a time measured by the image forming apparatus 100a at the time point of the setting.

At Step S25, the control unit 110 creates setting change information. The setting change information is information constituted of its mail body that includes "AAA.BBB.CCC" as the affiliation information, the present time (transmission date and time), and "ON," which is the setting after the change of the "eco" setting. At Step S26, the control unit 110 obtains a shared-information-transmission destination. As described above, the shared-information-transmission destination means the e-mail address (settei@mail.co.jp) set as the shared-setting-transmission destination.

At Step S27, the control unit 110 transmits an e-mail including the setting change information as a part of the body to the e-mail address (settei@mail.co.jp). First, the e-mail is transmitted to the mail server 200 via the communication interface unit 150. Thus, the control unit 110 functions as a setting-change-information transmitting unit. At Step S28, the control unit 110 changes the "eco" setting of the image forming apparatus 100a into "ON."

At Step S29, the user operates the operation processing unit 132 of the image forming apparatus 100a to close the copy setting screen 131c. This causes the "paper sheet size" and "eco" setting of the image forming apparatus 100a to be changed into "A4" and "ON," respectively. Then, the mail server 200 receives the setting change information on the "eco" setting.

Figure 7:
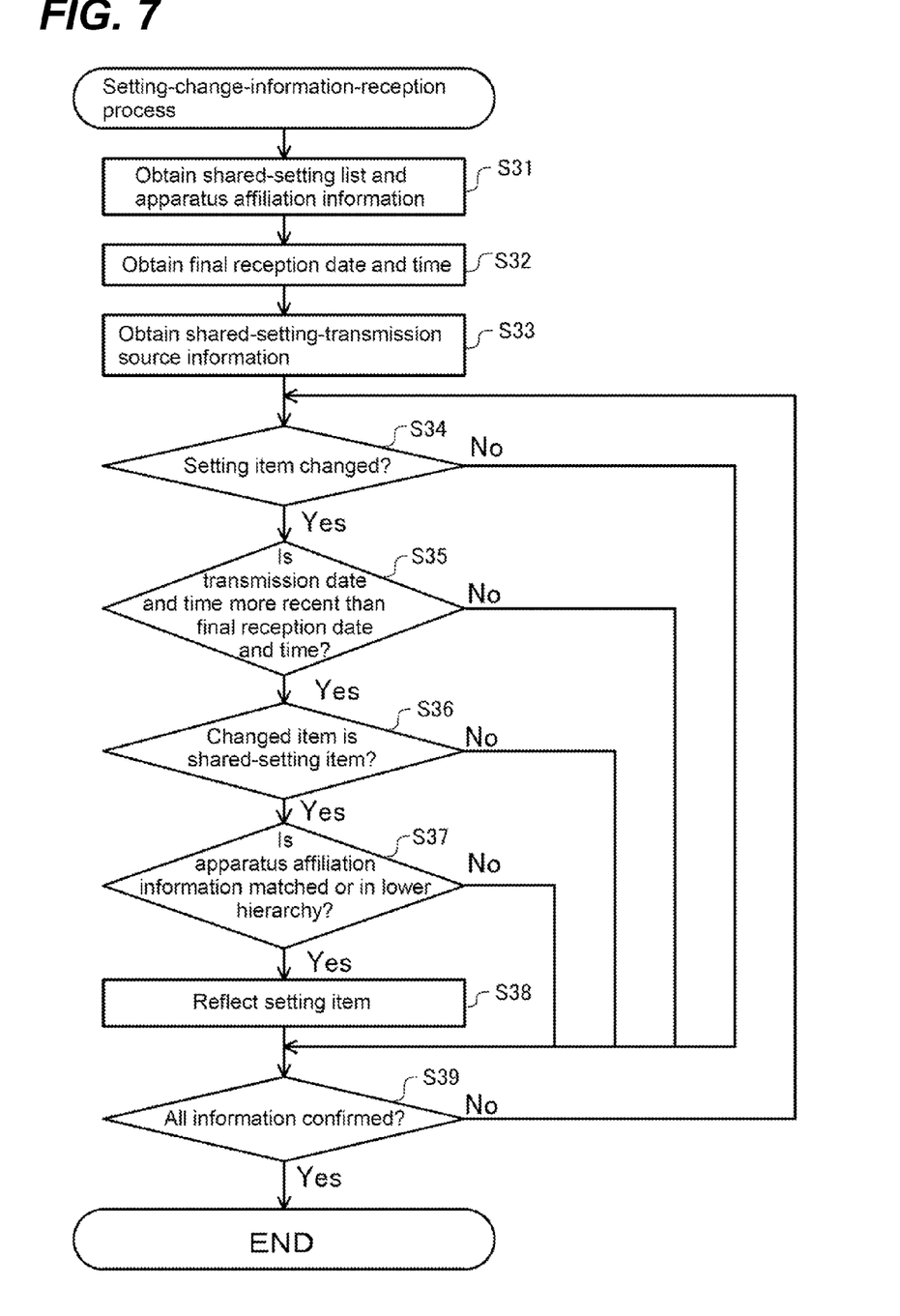
FIG. 7 illustrates a procedure for a setting-change-information-reception process according to the one embodiment.

FIG. 7 illustrates a procedure for a setting-change-information-reception process according to the one embodiment. This routine is activated in response to an e-mail reception by the image forming apparatus group 100. This example assumes that the two image forming apparatuses 100b and 100c receive an e-mail including a content in which the image forming apparatus 100a has changed the "eco" setting into "ON."

At Step S31, the control unit 110 obtains a shared-setting list and apparatus affiliation information. Specifically, the image forming apparatus 100b obtains "AAA.BBB.CCC" as its own affiliation information from the storage unit 140, and the image forming apparatus 100c obtains "AAA.BBB" as its own affiliation information from the storage unit 140. On the other hand, the respective image forming apparatuses 100 in the image forming apparatus group 100 obtain their own shared-setting lists each including the two items, the "color mode," and the "eco mode" from the respective storage units 140.

At Step S32, the control unit 110 obtains a final reception date and time. The final reception date and time means a date and time on which the e-mail including the setting change information in the body is finally received before this e-mail reception. The e-mail is received from the server 300 via the mail server 200.

At Step S33, the control unit 110 obtains shared-setting-transmission source information. The information includes the shared-setting list and the apparatus affiliation information. This example assumes a state where the image forming apparatus 100a performs the setting change, and then the image forming apparatus 100b receives the e-mail.

At Step S34, the control unit 110 determines whether or not the setting item has been changed. If the setting item has not been changed, the process proceeds to Step S39. If the setting item has been changed, the process proceeds to Step S35. In this example, the setting change information including the fact that the "eco" setting has been changed into "ON" is received. This causes the process to proceed to Step S35.

At Step S35, the control unit 110 determines whether or not the transmission date and time is more recent than the final reception date and time. If the transmission date and time is not more recent than (after) the final reception date and time, the process proceeds to Step S39. If the transmission date and time is more recent than (after) the final reception date and time, the process proceeds to Step S36. In this example, the transmission date and time on which the image forming apparatus 100a transmits the e-mail is after the reception date and time on which the image forming apparatus 100b receives the most recent e-mail. This causes the process to proceed to Step S36.

At Step S36, the control unit 110 determines whether or not the changed item is the shared-setting item of the image forming apparatus 100b. If the changed item is not its own shared-setting item, the process proceeds to Step S39. If the changed item is the shared-setting item, the process proceeds to Step S37. In this example, since the "eco" setting is the shared-setting item of the image forming apparatus 100b, the process proceeds to Step S37.

At Step S37, the control unit 110 determines whether or not the apparatus affiliation information is matched or in a lower hierarchy. If the apparatus affiliation information is not matched or is not in the lower hierarchy, the process proceeds to Step S39. If the apparatus affiliation information is matched or in the lower hierarchy, the process proceeds to Step S38.

In this example, since the apparatus affiliation information of the image forming apparatus 100b matches the apparatus affiliation information of the image forming apparatus 100a, the process for the image forming apparatus 100b proceeds to Step S36. On the other hand, since the apparatus affiliation information of the image forming apparatus 100c does not match the apparatus affiliation information of the image forming apparatus 100a and is not in the lower hierarchy, the process for the image forming apparatus 100c proceeds to Step S39.

Figure 8:
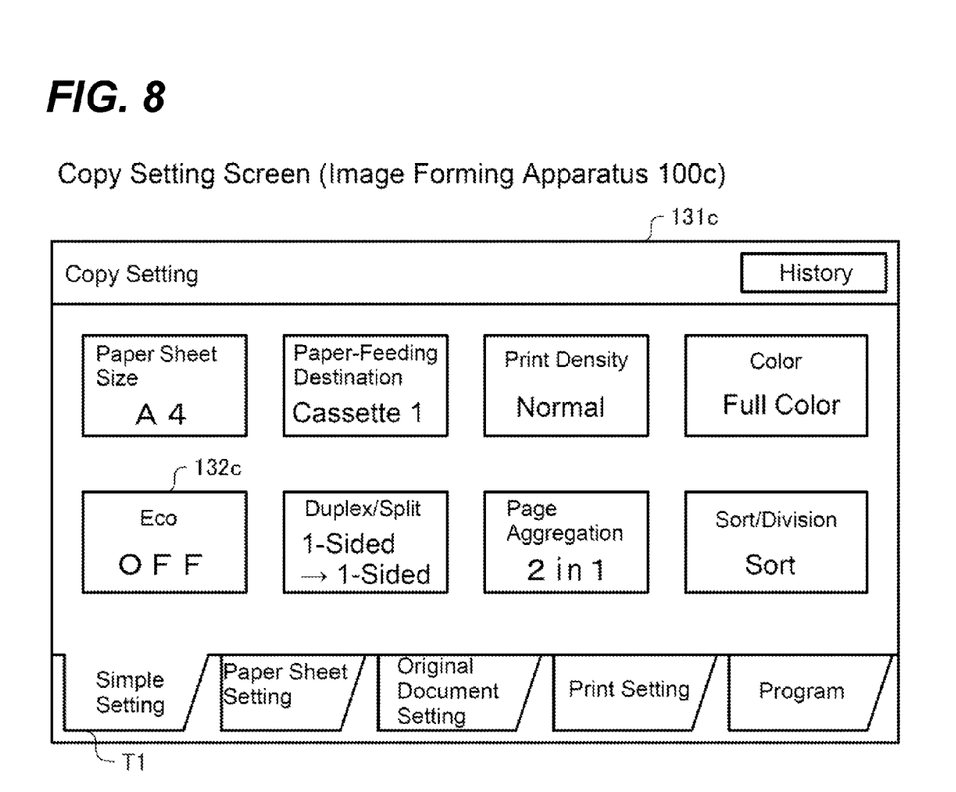
FIG. 8 illustrates a copy setting screen according to the one embodiment.

At Step S38, the control unit 110 of the image forming apparatus 100b functions as a setting unit to reflect the setting item into the image forming apparatus 100b. Specifically, as illustrated in FIG. 6B, the "eco" setting of the image forming apparatus 100b is set to "ON." Meanwhile, as illustrated in FIG. 8, the control unit 110 of the image forming apparatus 100c does not reflect the setting item into the image forming apparatus 100c, and keeps an "OFF" state.

Figure 9A:
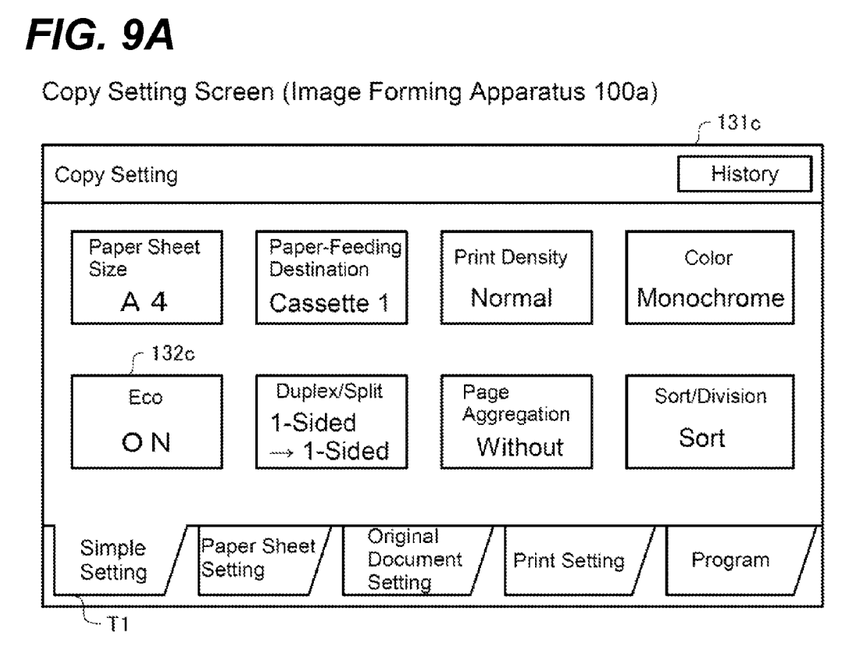
FIGS. 9A and 9B illustrate a copy setting screen according to the one embodiment.
Figure 9B:
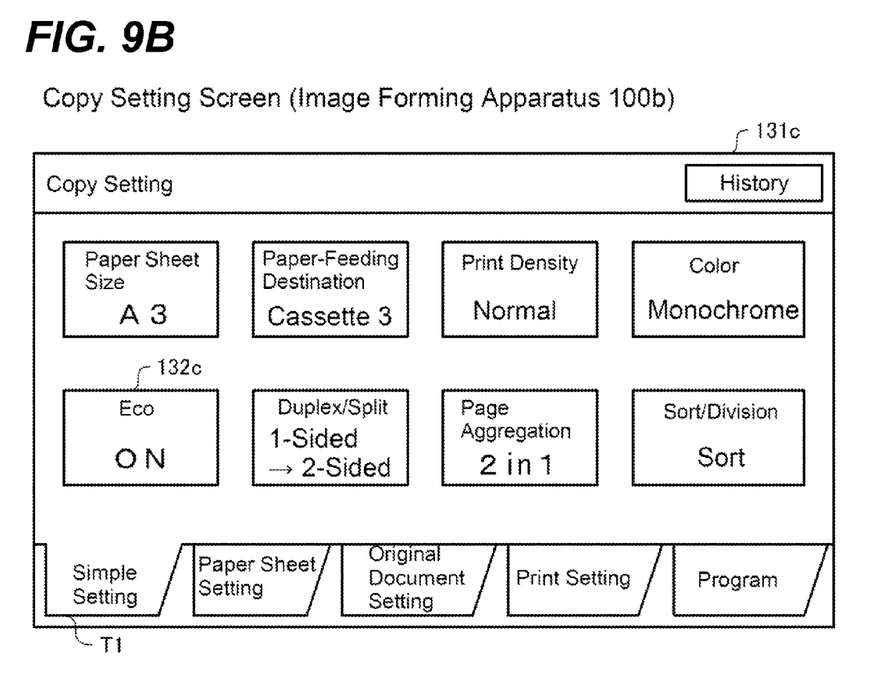

Next, assume a case where the image forming apparatus 100c transmits an e-mail including the content in which the image forming apparatus 100c has changed the "color" setting to be set to a "monochrome," and then the two image forming apparatuses 100a and 100b receive the e-mail. In this case, since two pieces of the apparatus affiliation information of the image forming apparatuses 100a and 100b are in the lower hierarchy of the apparatus affiliation information of the image forming apparatus 100c, the process proceeds to Step S38. Consequently, as illustrated in FIGS. 9A to 9B, both the control units 110 of the two image forming apparatuses 100a and 100b reflect the setting item into the image forming apparatuses 100a and 100b to set the "color" setting to the "monochrome."

As described above, in the embodiment, the image forming system automatically manages the shared-setting item based on the shared-setting list. Thus, the users do not need to mind the sharing of the setting items. Furthermore, the image forming system 10 uses pieces of the apparatus affiliation information having a hierarchical structure to group the apparatuses that share the setting item. This causes the image forming system 10 to, for example, manage a shared setting of a plurality of image forming apparatuses in accordance with an organization hierarchy.

In addition to the above-described respective embodiments, the following modifications implement the disclosure.

MODIFICATION 1

While in the above-described embodiment the three image forming apparatuses 100a, 100b, and 100c include the identical shared-setting list, the three image forming apparatuses 100a, 100b, and 100c may include respective different shared-setting lists. In this case, the setting is consequently shared within a range common to the three shared-setting lists. Specifically, it is assumed that the three shared-setting lists include the following contents:

(1) image forming apparatus 100a: the "printing paper sheet type" and the "page aggregation";
(2) image forming apparatus 100b: the "duplex/split" and the "page aggregation"; and
(3) image forming apparatus 100c: the "printing paper sheet type" and the "duplex/split."

Firstly, if the "page aggregation" setting of the image forming apparatus 100a, which is a transmission side, is changed, the "page aggregation" setting of the image forming apparatus 100b, which is a reception side, is automatically changed. In this case, even if the "printing paper sheet type" setting of the image forming apparatus 100a is changed, the settings of the other image forming apparatuses 100b and 100c are not automatically changed. That is because the image forming apparatus 100c belongs to an upper hierarchy of the image forming apparatus 100a.

Secondly, even if the "duplex/split" setting of the image forming apparatus 100b, which is a transmission side, is changed, the settings of the other image forming apparatuses 100a and 100c are not automatically changed. If the "page aggregation" setting of the image forming apparatus 100b is changed, the "page aggregation" setting of the image forming apparatus 100a is automatically changed.

Thirdly, if the "printing paper sheet type" setting of the image forming apparatus 100c, which is a transmission side, is changed, the "printing paper sheet type" setting of the image forming apparatus 100a, which is a reception side, is also automatically changed. If the "duplex/split" setting of the image forming apparatus 100c is changed, the "duplex/split" setting of the image forming apparatus 100b is also automatically changed.

MODIFICATION 2

While in the above-described embodiment, the image forming system is configured such that if the shared-setting item of the image forming apparatus is changed, the shared-setting item of the image forming apparatus belonging to an identical or in a lower hierarchy is changed, and the shared-setting item of the image forming apparatus belonging to the upper hierarchy is not changed. Accordingly, this configuration permits that the shared-setting items of the image forming apparatus 100c, which belongs to the upper hierarchy, and the image forming apparatuses 100a and 100b, which belong to the lower hierarchy, are different one another.

However, the disclosure is not limited to such configuration. Specifically, for example, the two image forming apparatuses 100a and 100b cause the storage units 140 to store the shared-setting item and a set content of the image forming apparatus 100c, which belongs to the upper hierarchy, and the set content change of the shared-setting item of the image forming apparatus 100c, which belongs to the upper hierarchy, is forbidden, the two image forming apparatuses 100a and 100b may be configured to share the setting of the shared-setting item shared by only the two image forming apparatuses 100a and 100b. Furthermore, the plurality of the image forming apparatuses of the disclosure do not have to belong to the plurality of the hierarchized groups.

MODIFICATION 3

While in the above-described embodiment, the disclosure is applied to the three image forming apparatuses 100a, 100b, and 100c, which are connected to the mail server 200 via the network, all the image forming apparatuses do not always need to be connected to the mail server 200 via the network. The disclosure may be applied to a plurality of image forming apparatuses connected to the mail server 200 via the Internet. Furthermore, an e-mail may not be used for the communication among the plurality of the image forming apparatuses. The plurality of the image forming apparatuses may communicate via, for example, an FTP server or an encrypted line.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus adapted as one of a plurality of image forming apparatuses belonging to any of a plurality of hierarchized groups, in an image forming system including the plurality of image forming apparatuses and a management device, the management device mediating communications among the plurality of image forming apparatuses, the image forming apparatus comprising:
   a control unit being at least either a micro-processing unit or a central processing unit:
   as functionality of the control unit, a setting unit that sets a plurality of setting items, the plurality of setting items determining operational content of the image forming apparatus;
   a storage unit storing a shared-setting list as a shared-setting target among the plurality of setting items;
   an operation display unit that accepts a shared-setting input and a setting-change input, the shared-setting input being for setting a shared-setting item included in the shared-setting list among the plurality of setting items, the setting-change input being for changing settings of the plurality of setting items; and
   as functionality of the control unit, a setting-change-information transmitting unit that, in response to the setting-change input for the shared-setting item, transmits to the management device setting change information indicating content of the setting change; wherein
   the setting unit, in response to reception of the setting change information from the management device, sets the setting item using the received setting change information if there has been a setting change to the setting item included in the shared-setting list, and if the hierarchical level of the receiving image forming apparatus group is identical to or lower than the hierarchical level of the transmitting image forming apparatus group.

2. The image forming apparatus according to claim 1, wherein:
   the storage unit stores apparatus affiliation information indicating a group to which the image forming apparatus belongs;
   the setting-change-information transmitting unit transmits the setting change information along with the apparatus affiliation information; and
   the setting unit, using the transmitted apparatus affiliation information, determines whether the hierarchical level of the receiving image forming apparatus group is identical to or lower than the hierarchical level of the transmitting image forming apparatus group.

3. The image forming apparatus according to claim 1, wherein the operation display unit accepts input for setting an affiliation group, the affiliation group being a group to which the image forming apparatus including the setting unit belongs.

4. The image forming apparatus according to claim 1, wherein:
   the setting-change-information transmitting unit transmits the setting change information together with transmission date and time, the transmission date and time being date and time at point of transmission; and
   when the transmission date and time is after a final reception date and time for the setting change information, the setting unit sets the setting item using the setting change information received together with the transmission date and time.

5. The image forming apparatus according to claim 1, wherein the setting-change-information transmitting unit transmits the setting change information as a part of an e-mail and uses the e-mail's destination address to designate the management device.

6. An image forming system comprising:
   the plurality of image forming apparatuses according to claim 1; and
   a management device that mediates communications among the plurality of image forming apparatuses.

7. An image forming method using a plurality of image forming apparatuses belonging to any of a plurality of hierarchized groups, and a management device, the management device mediating communications among the plurality of the image forming apparatuses, the image forming method comprising:
   setting a plurality of setting items, the plurality of setting items determining operational content of the image forming apparatus;
   storing a shared-setting list as a shared-setting target among the plurality of setting items; accepting a shared-setting input and a setting-change input, the shared-setting input being for setting a shared-setting item included in the shared-setting list among the plurality of setting items, the setting-change input being for changing settings of the plurality of setting items; and transmitting to the management device, in response to the setting-change input for the shared-setting item, setting change information indicating content of the setting change; wherein the setting includes setting, in response to reception of the setting change information from the management device, the setting item using the received setting change information if there has been a setting change to the setting item included in the shared-setting list and if the hierarchical level of the receiving image forming apparatus group is identical to or lower than the hierarchical level of the transmitting image forming apparatus group.

8. An image forming program that controls an image forming apparatus employed in an image forming system including a plurality of image forming apparatuses belonging to any of a plurality of hierarchized groups, and a management device, the management device mediating communications among the plurality of the image forming apparatuses, the image forming program causing the image forming apparatus to function as:
   a setting unit that sets a plurality of setting items, the plurality of setting items determining operational content of the image forming apparatus;
   a storage unit storing a shared-setting list as a shared-setting target among the plurality of setting items;
   an operation display unit that accepts a shared-setting input and a setting-change input, the shared-setting input being for setting a shared-setting item included in the shared-setting list among the plurality of setting items, the setting-change input being for changing settings of the plurality of setting items; and
   a setting-change-information transmitting unit that, in response to the setting-change input for the shared-setting item, transmits to the management device setting change information indicating content of the setting change; wherein
   the setting unit, in response to reception of the setting change information from the management device, sets the setting item using the received setting change information if there has been a setting change to the setting item included in the shared-setting list, and if the hierarchical level of the receiving image forming apparatus group is identical to or lower than the hierarchical level of the transmitting image forming apparatus group.

* * * * *